J. H. GILLILAND.
SPRING AXLE.
APPLICATION FILED DEC. 22, 1914.
1,138,467.
Patented May 4, 1915.
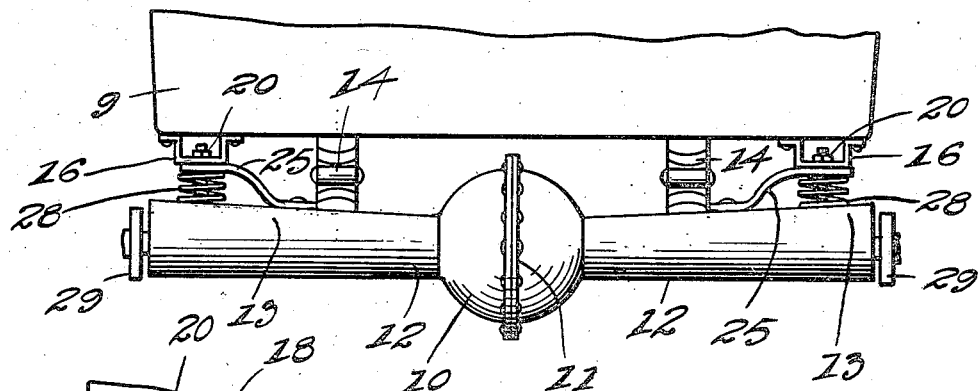
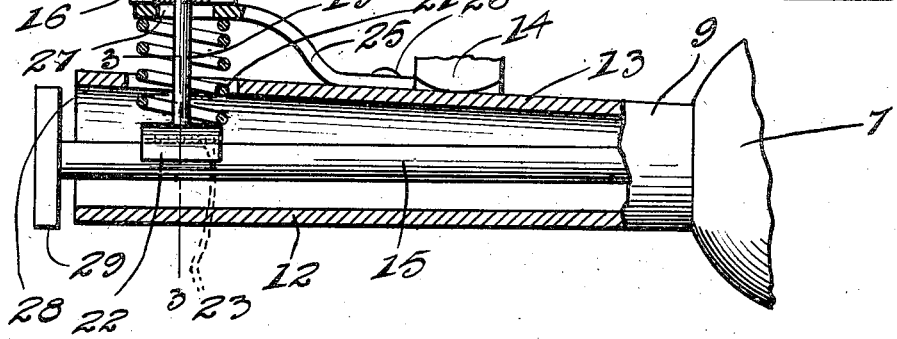
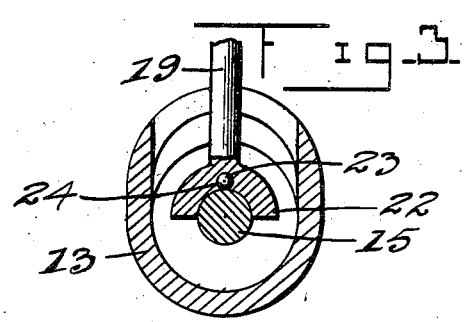
Inventor
J.H. Gilliland,
Witnesses

UNITED STATES PATENT OFFICE.

JAMES H. GILLILAND, OF GREENSBORO, NORTH CAROLINA.

SPRING-AXLE.

1,138,467. Specification of Letters Patent. Patented May 4, 1915.

Application filed December 22, 1914. Serial No. 878,570.

*To all whom it may concern:*

Be it known that I, JAMES H. GILLILAND, a citizen of the United States, residing at Greensboro, in the county of Guilford and State of North Carolina, have invented certain new and useful Improvements in Spring-Axles; and I do hereby declare the following to be a full, clear, and exact description of the invention, such as will enable others skilled in the art to which it appertains to make and use the same.

This invention comprehends certain new and useful improvements in spring axles and has for its primary object to provide a spring axle which will be of extremely simple construction as well as highly efficient in use.

The invention has for another object to provide an axle casing with resilient connections between the same and the body of the vehicle positioned above said axle casing, and also resilient connections between the body of the vehicle and the opposite sections of the sectional axle extended through said casing.

The invention has for a further object, the provision of a resilient axle mounting of the above stated character in which the parts will be of simple construction and operation as well as durable and highly efficient in use.

The invention has for a still further object, the provision of a resilient axle mounting which will be especially adapted for use as an axle mounting for automobiles or similar vehicles and in which the sections of the axle will be in the form of floating axle sections with resilient connections between the same and the depending supporting brackets carried by the vehicle body, while the axle casing is engaged around and spaced from the axle sections and resiliently suspended from the vehicle body and the depending brackets carried by the latter.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is an elevation of a rear axle and resilient support for the same constructed in accordance with my invention. Fig. 2 is a longitudinal section of one half of the same, partly in elevation, and Fig. 3 is a transverse section on the plane of line 3—3 of Fig. 2.

Referring in detail to the drawings by numerals, 9 designates the body of a vehicle, beneath which is positioned and suspended in any suitable manner, the differential casing 10 which is preferably formed in sections connected, as shown at 11, and having extended portions forming the opposite halves 12 of the rear axle casing. Each half 12 of the rear axle casing has its upper edge inclined, as shown at 13, toward its outer end, the purpose of which will presently be apparent.

The usual springs 14 are secured to the underface of the vehicle body 9 in any suitable and well known manner and also to the upper inclined faces 13 of the rear axle casing halves 12 at spaced distances from the inner ends thereof to form a resilient connection between said rear axle halves 12 and the vehicle body 9.

The opposite floating halves 15 of the rear axle extend longitudinally through and are spaced from the inner walls of the rear axle casing halves 12.

Depending from the vehicle body 9, adjacent the opposite sides thereof, are the U-shaped supporting and guiding brackets 16 which have their opposite upper ends 17 turned outwardly and secured to the vehicle body bottom in any suitable and well known manner. Slidably engaged through the central opening 18 in the lower depending portion of each bracket 16 is a guide pin 19 which extends vertically and has a nut 20 or the like threaded upon its upper end within the brackets 16 to limit downward movement of said pin 19. The pin 19 is extended through a suitable opening 21 in the upper inclined face 13 of the axle casing halves 12 immediately below said brackets 16, said opening 21 being adjacent the outer open end of said axle casing half 12. The pin 19 has formed on its lower end a bearing hood 22 which is of substantially semi-circular form in cross section and of rectangular form in general outline or bottom plan, said bearing hood 22 resting upon the portion of the outer floating axle section 15, while suitable bearing balls 23 are positioned in a groove or channel 24 formed in the longitudinal center of the bottom of said bearing hood 22 to bear upon the upper face of said outer floating axle section 15 and reduce friction to the minimum.

To further assist in guiding the movable parts of the invention and form a resilient connection between the axle casing half 12 and the vehicle body 8, I have provided a reversely curved leaf spring guide 25, which has its inner end secured upon the upper face of the rear axle casing half 12, as shown at 26, while its opposite end is provided with a suitable elongated opening 27 to accommodate the guide pin 19 which extends through the same, this last mentioned end of the reversely curved leaf spring guide 25 bearing against the under face of the central or depending portion of the U-shaped brackets 16.

Resilient connection is formed between each outer floating axle section 15 and the vehicle body 9, by means of the helical springs 28 which are engaged around the pin 19 and have their upper ends bearing against the under faces of the outer ends of the reversely curved leaf spring guide 25, while the lower ends of said springs bear upon the faces of the bearing hood 22, it being understood that the springs 28 extend through the opening 21 in the rear axle casing halves 12.

From the foregoing it will be readily seen that upon engagement of the wheels 29 mounted upon the outer end of the outer floating axle sections 15, with hollowed or raised obstructions in the path of the vehicle, the resilient connections between the said outer floating sections 15 and the rear axle halves 12 engaged around the same, and the vehicle body 9, will serve to absorb all shocks. It will also be seen as the upper faces of the rear axle casing halves 12 are inclined, the floating axle sections 15 will be given plenty of space within said axle casing halves 12.

While I have shown and described the preferred embodiment of my invention, it will be understood that minor changes in the details of construction, combination and arrangement of parts may be made without departing from the spirit and scope of the invention as claimed, or sacrificing any of the advantages thereof.

What is claimed is:—

1. In a device of the class described, the combination with a vehicle body, of an axle casing beneath said body, resilient connections between said body and said axle casing, a floating axle section within said casing, and resilient connections between said floating axle section and said vehicle body.

2. In a device of the class described, the combination with a vehicle body, of an axle casing beneath said body, resilient connections between said body and said axle casing, a floating axle section within said casing, resilient connections between said floating axle section and said vehicle body, and means for guiding the floating axle section in its movement within the axle casing.

3. In a device of the class described, the combination of a vehicle body, an axle casing beneath the same, resilient connections between the axle casing and the vehicle body, floating axle sections extending longitudinally in opposite directions through said axle casing from the center thereof to a point beyond the opposite halves of said axle casing, the opposite halves of the axle casing being provided with outwardly inclined upper faces, said upper faces having openings positioned therein adjacent the outer ends of said halves of the casing, bracket members carried by said vehicle body above said opening, guide pins depending through said bracket members, bearing hoods carried by said guide pins and positioned upon said axle sections, bearing balls carried by said hood bearings, cushion springs engaged around said guide pins and bearing upon said bearing hood, and resilient connections between said brackets and the opposite halves of said casing.

4. The combination with a vehicle body, of an axle casing beneath the body, a spring extending longitudinally of the casing and connected with the same and with the vehicle body, a floating axle within said casing and a coiled spring interposed between the axle and the first mentioned spring.

In testimony whereof I affix my signature in presence of two witnesses.

JAMES H. GILLILAND.

Witnesses:
E. E. BAIN,
W. C. GARRETT.